United States Patent [19]
Tow

[11] Patent Number: 5,832,189
[45] Date of Patent: Nov. 3, 1998

[54] AFFECT-BASED ROBOT COMMUNICATION METHODS AND SYSTEMS

[75] Inventor: Robert F. Tow, Los Gatos, Calif.

[73] Assignee: Interval Research Corporation, Palo Alto, Calif.

[21] Appl. No.: 721,006

[22] Filed: Sep. 26, 1996

[51] Int. Cl.$^6$ ........................................ G06F 19/00
[52] U.S. Cl. ........................ 395/94; 395/83; 901/47
[58] Field of Search .................... 395/83, 94, 84, 395/82, 93; 364/167.01; 318/568.11, 568.12, 568.16; 901/47; 446/337, 338; 463/30–35; 345/952, 978

[56] References Cited

U.S. PATENT DOCUMENTS

| | | | |
|---|---|---|---|
| 4,028,533 | 6/1977 | Matsubara | 395/83 X |
| 4,729,563 | 3/1988 | Yokoi | 395/94 X |
| 5,426,732 | 6/1995 | Boies et al. | 345/349 |
| 5,596,255 | 1/1997 | Miyazawa | 395/94 X |
| 5,608,847 | 3/1997 | Pryor | 395/94 X |

*Primary Examiner*—Joseph Ruggiero
*Attorney, Agent, or Firm*—Brooks & Kushman P.C.

[57] ABSTRACT

An affect-based method of communication between robots is provided by displaying a visual facial expression indicative of a simulated emotional state on a display device of a first robot, and viewing the visual facial expression using a camera on a second robot. The simulated emotional state may be one of happiness, anger, or sadness, for example. The second robot determines the simulated emotional state based upon the visual facial expression. The second robot processes the simulated emotional state to redefine its own simulated emotional state, and to display a visual facial expression indicative thereof. The visual facial expression allows a human observer to discern the simulated emotional state of the robot. Optionally, the robots further communicate affect using audio tones.

38 Claims, 5 Drawing Sheets

AFFECT-BASED ROBOT COMMUNICATION METHODS AND SYSTEMS

TECHNICAL FIELD

This invention relates to robots and methods of communication and operation therefor.

BACKGROUND ART

Desktop-centric paradigms have been universally accepted over the past couple of decades to provide means for communication and computation to individuals. A workstation is one example of a desktop-centric paradigm. The workstation typically includes input devices such as a keyboard, a mouse and a microphone, computational resources such as a microprocessor and a memory, and output devices such as a display device and speakers. The input devices, computational resources, and output devices of the workstation are located at a fixed point, such as on a desk, for utilization by an individual. Because of the size and weight of a typical desktop workstation, the individual is not likely to carry the workstation with him/her as he/she traverses his/her environment in the course of an average day. Hence, the individual typically returns to the fixed point location of the workstation in order to utilize its communication and computational resources.

Workstations in the form of portable computers are less restricted in being located at a single fixed point due to their reduced size and weight. However, portable computers only extend the desktop-centric paradigm to a series of fixed points dependent upon placement thereof by the individual. Portable computers are not amenable to be continually carried by the individual as the individual traverses his/her environment during the course of an average day. For example, an individual would find it highly undesirable to lug a portable computer around as he/she walks from each room to each other room at home or at work.

Accordingly, the need exists for an individual-centric paradigm for computation and/or communication as an alternative to the desktop-centric paradigm provided by the workstation. The individual-centric paradigm would provide computation and/or communication at more than a series of fixed points.

Another universally-accepted paradigm is that of communicating information between computers using modulated signals representative of digital data. The modulated signals are formed in accordance with a predetermined modulation scheme for communication either wirelessly or via a wireline, and using either baseband or broadband signals. Typically, these modulated signals are not parsable in the realm of the senses of a human. Broadband electrical signals, for example, are not within the realm of human senses. Telephonic modem signals, which are audible for a human to hear, are not within the realm of parsing by the human.

At the 1994 ISAE Conference, an alternative to the above-described approaches to computer communication was presented. In particular, a semaphore robot was presented which waved boy-scout semaphore flags to display a message entered at a computer keyboard. Another computer located a mile away watched the flags with a camera, digitized the images, and recognized and displayed the message. Although a human is capable of viewing this form of communication, the human must learn the semaphore signaling system in order to parse the message.

SUMMARY OF THE INVENTION

It is an object of the present invention to provide a method of machine communication which is parsable within the realm of human senses.

A further object of the present invention is to provide an individual-centric paradigm as an alternative to desktop-centric paradigms.

In carrying out the above objects, the present invention provides a robot having a processor which executes a sequence of program steps to define a first internal state. A display device communicates with the processor to display a first visual facial expression indicative of the first internal state. A camera communicates with the processor to view a second visual facial expression from a like robot. Based upon the second visual facial expression viewed by the camera, the processor determines a second internal state of the like robot.

In preferred embodiments of the present invention, the first and second internal states are simulated emotional states of the robots. The simulated emotional states are selected from such emotions as anger, fear, sadness, and happiness. Corresponding to these simulated emotional states are visual facial expressions which allow a human observer to discern the simulated emotional state of the robot.

The robot, in a preferred embodiment, further includes an auditory input sensor to sense a vocal signal produced by a human. A voice analyzer is provided to analyze the vocal signal to detect an affect of the human. The processor processes the affect detected by the voice analyzer along with the second internal state of the like robot to redefine the robot's first internal state. A genetic algorithm is utilized by the processor to process the affect and the second internal state to redefine the first internal state.

Further in the preferred embodiment, the robot includes a transport mechanism for positioning the robot within an environment based upon a control signal. An object sensor is provided in communication with the processor to detect a position of an object within the environment of the robot. The processor generates the control signal to position the robot based upon the position of the object. The object which is detected can be either a human or the like robot within the environment of the robot. The transport mechanism and the object sensor can be utilized to position the robot to facilitate communication with either the human or the like robot. Alternatively, the transport mechanism and the object sensor can be utilized to move the robot in synchrony with movements of either the human or the like robot.

Embodiments of the present invention are advantageous in providing non-semantic communication between robots in a way that is also parsable by people. Further, the robots advantageously provide an individual-centric paradigm by operating in packs or flocks about humans.

These and other features, aspects, and advantages of the present invention will become better understood with regard to the following description, appended claims, and accompanying drawings.

BEST MODE FOR CARRYING OUT THE INVENTION

Figure 1:
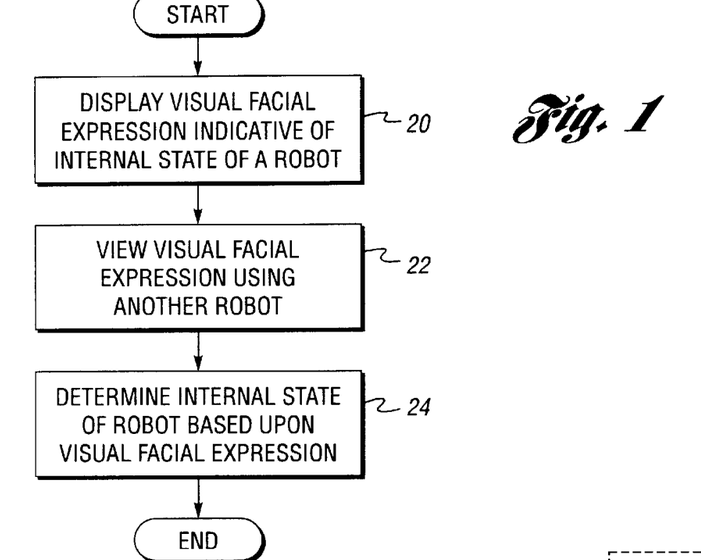
FIG. 1 is a flow chart of an embodiment of a method of communicating an internal state of a first robot to a second robot.

Turning now to FIG. 1, there is shown a method of communicating an internal state of a first robot to a second robot. As indicated by block 20, the method includes the step of displaying a visual facial expression indicative of the internal state of the first robot. Preferably, the internal state is a simulated emotional state of the first robot, and the visual facial expression corresponds to this simulated emotional state. For example, the simulated emotional state may be selected from such emotions as anger, fear, sadness and happiness. Corresponding to these simulated emotional states are visual facial expressions such as an anger visual facial expression, a fear visual facial expression, a sadness visual facial expression, and a happiness visual facial expression. It is preferred that these visual facial expressions be discernable by a human observer.

The method further includes a step of viewing the visual facial expression using the second robot, as indicated by block 22. The visual facial expression may be viewed on the second robot using an onboard camera. Based upon the visual facial expression which is viewed, the second robot performs a step of determining the internal state of the first robot, as indicated by block 24. As a result, a method of non-semantic communication between robots is provided in a way that is also parsable by human observers. Further, the robots communicate affect, that is, feeling or emotion particularly directed toward action.

Figure 2:
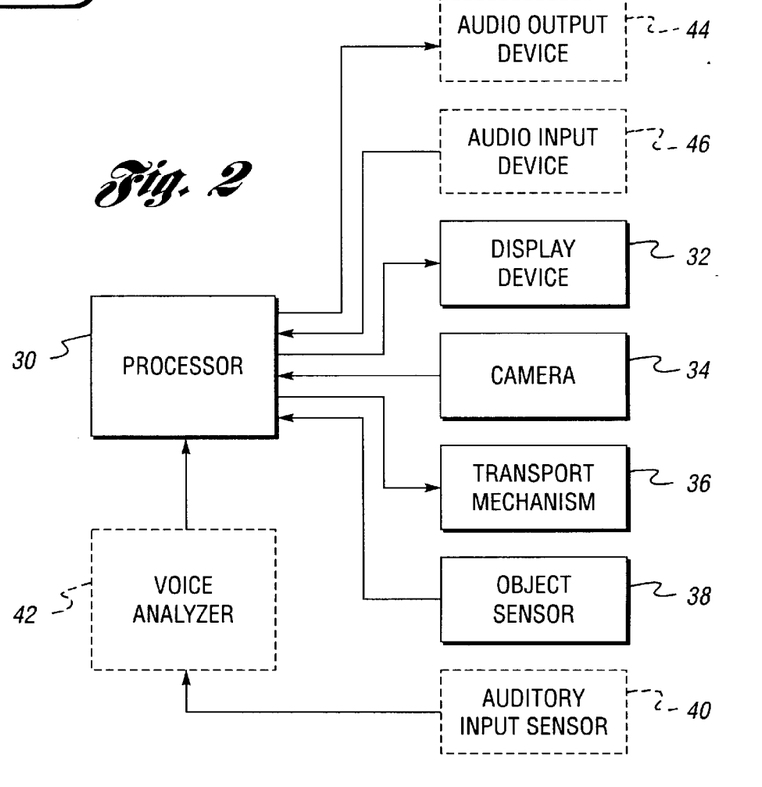
FIG. 2 is a block diagram of an embodiment of a robot in accordance with the present invention.

Referring to FIG. 2, there is shown a block diagram of an embodiment of a robot in accordance with the present invention. The robot includes a processor 30 which executes a sequence of program steps to define a first internal state of the robot. The processor 30 can be in the form of a single board computer which controls the operation of the robot. If desired or required, the processor 30 can include an off-board computing system.

A display device 32 is provided in communication with the processor 30. The display device 32 can be embodied using any of a number of display technologies, such as liquid crystals, light-emitting diodes, or a cathode-ray tube. The display device 32 displays a first visual facial expression indicative of the first internal state of the robot. Preferably, the first internal state is a simulated emotional state of the robot, and the first visual facial expression is selected from a plurality of visual facial expressions representative of various emotional states.

At the very least, it is preferred that the plurality of visual facial expressions include an anger expression, a sadness expression, and a happiness expression. These visual facial expressions correspond to simulated emotional states of anger, sadness, and happiness. In general, the robot can be capable of displaying any of a number of emotions. These emotions include, but are not limited to, pain, weeping, suffering, low spirits, grief, dejection, despair, anxiety, joy, high spirits, love, devotion, reflection, meditation, ill-temper, sulkiness, determination, hatred, anger, disdain, contempt, disgust, guilt, pride, helplessness, patience, affirmation, negation, surprise, astonishment, fear, horror, blushing, shame, shyness, modesty. These and other emotions are described in "The Expression of the Emotions in Man and Animals" by Charles Darwin. Darwin describes a number of basic visual emotional displays for all mammals that are expressive and well understood by humans. Hence, it is preferred that the first visual facial expression be discernable by a human observer.

A camera 34 is provided in communication with the processor 30 to view a second visual facial expression displayed from a like robot. The camera 34 communicates a digitized representation of the second visual facial expression to the processor 30, which in turn determines a second internal state of the like robot. Preferably, the second internal state of the like robot is a simulated emotional state corresponding to the visual facial expression which is displayed. Further, it is preferred that the second visual facial expression also be discernable by a human observer.

The robot includes a transport mechanism 36 for positioning the robot within an environment base upon a control signal. The transport mechanism 36 can comprise, for example, a plurality of wheels driven by one or more motors controlled by the control signals The control signal is generated by the processor 30 for controlling the transport mechanism 36.

The robot is positioned in dependence upon signals provided by an object sensor 38. The object sensor 38 communicates with the processor 30 to detect a position of an object within the environment of the robot. The object may be, for example, a human or another robot within the robot's environment. The object sensor 38 can comprise, for example, a directional pyrometer.

The processor 30 generates a control signal to position the robot based upon the position of the object. The control signal may be utilized by the transport mechanism 36 to position the robot to facilitate communication with either a human observer or another robot. The control signal can also be utilized by the transport mechanism 36 to move the robot in synchrony with movements of the human observer or the like robot.

Optionally, an auditory input sensor 40 is provided to sense a vocal signal produced by a human. The auditory input sensor is coupled to a voice analyzer 42 which analyzes the vocal signal to detect an affect of the human. A signal representative of the affect is provided to the processor 30. The processor 30 utilizes the affect signal in its execution of the sequence of program steps. Although illustrated in terms of two blocks, it is noted that the voice analyzer 42 and the processor 30 can be embodied by the same computer.

As another option, an audio output device 44 is provided to generate a series of audio tones indicative of the first internal state of the robot. The audio output device 44 can take the form of one or more speakers, for example. An audio input device 46, such as a microphone, is provided to receive a series of audio tones indicative of an internal state of a like robot. The processor 30 determines the internal state of the like robot based upon the series of audio tones received by the audio input device 46.

Preferably, the series of audio tones mimic bird-like sounds such as chirping sounds. In one embodiment, the chirping sounds have a frequency around 4 KHz. This allows robots to communicate to one another using plain old telephone lines. Either the robot itself or a human observer can place a telephone handset in proximity to the audio output device 44 and the audio input device 46 to allow telephonic communication with another robot.

The processor 30 processes the visual facial expression viewed by the camera 34, and optionally, the series of audio tones received by the audio input device 46 and the affect signal produced by the voice analyzer 42 to redefine the first internal state of the robot. One approach to redefining the internal state of the robot is to utilize a genetic algorithm to process the received signals. In particular, the processor 30 can utilize a table comprised of a sequence of thresholds. Quantities computed by the processor 30 are compared to the sequence of thresholds in order to redefine the internal state of the robot. The thresholds are allowed to evolve both by mutation and recombination. Other evolutionary driving mechanisms which can be incorporated in the genetic algorithm include a form of death and a form of disease.

Figure 3:
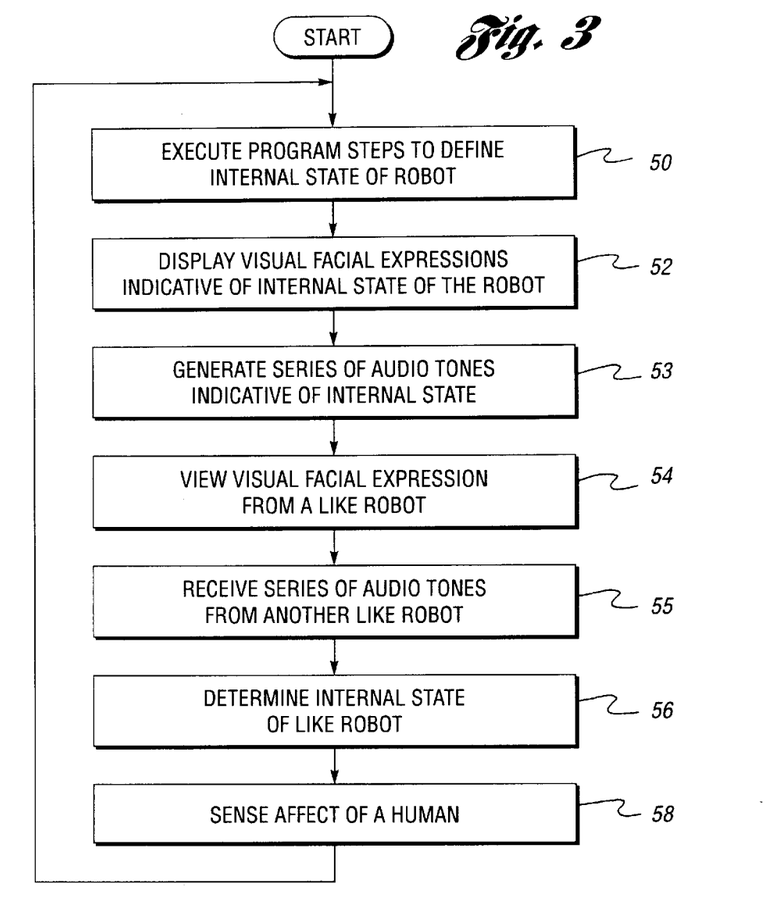
FIG. 3 is a flow chart of a method of operating a robot in accordance with embodiments of the present invention.

FIG. 3 shows a flow chart of a method of operating a robot in accordance with embodiments of the present invention. As indicated by block 50, a step of executing program steps to define an internal state of the robot is performed. These program steps are executed utilizing the processor 30.

As indicated by block 52, a visual facial expression indicative of the internal state of the robot is displayed. The visual facial expression is displayed using the display device 32. Optionally, the robot generates a series of audio tones indicative of its internal state, as indicated by block 53. The series of audio tones are generated using the audio output device 44.

As indicated by block 54, the robot views a visual facial expression displayed from another robot. The visual facial expression is viewed utilizing the camera 34. Optionally, the robot receives a series of audio tones generated from another robot, as indicated by block 55. These audio tones are indicative of the internal state of the other robot. The audio tones are received using the audio input device 46.

As indicated by block 56, the robot determines the internal state of the other robot using the visual facial expression viewed by the camera 34. This step of processing is performed by the processor 30.

As indicated by block 58, the robot senses an affect of a human. The affect of the human is sensed using the auditory input sensor 40 and the voice analyzer 42.

Upon performing steps 50–58, flow of the method is directed back up to block 50. At this point, the processor 30 executes a sequence of program steps to redefine the internal state of the robot. The internal state of the robot is redefined based upon the internal state of another robot as indicated by either its visual facial expression or a series of audio tones. Further, the internal state of the robot can be redefined based upon the affect of the human. The internal state of the other robot and the affect of the human can be processed using a genetic algorithm to redefine the internal state of the robot.

Figure 4:
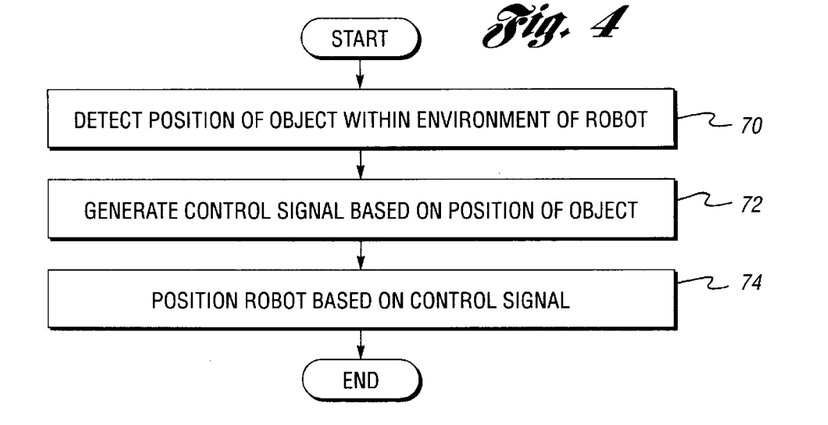
FIG. 4 is a flow chart of a method of positioning a robot.

Turning now to FIG. 4, there is shown a flow chart of a method of positioning the robot using the transport mechanism 36. As indicated by block 70, a position of an object within an environment of the robot is detected. The position of the object is detected using the object sensor 38 in communication with the processor 30. As noted earlier, the object can include a human or another robot within the robot's environment.

As indicated by block 72, a step of generating a control signal based upon the position of the object is performed. The control signal is generated using the processor 30 within the robot, As indicated by block 74, a step of positioning the robot based upon the control signal is performed. This is accomplished by providing the control signal from the processor 30 to the transport mechanism 36.

Utilizing the above-described steps, the transport mechanism 36 can position the robot to facilitate communication with either a human or another like robot. For example, the transport mechanism 36 can position the robot so that its camera 34 can view a visual facial expression displayed on a display device of another robot. Alternatively, the above-described step can cause the transport mechanism to move the robot in synchrony with movements of either the human or the like robot.

Figure 5:
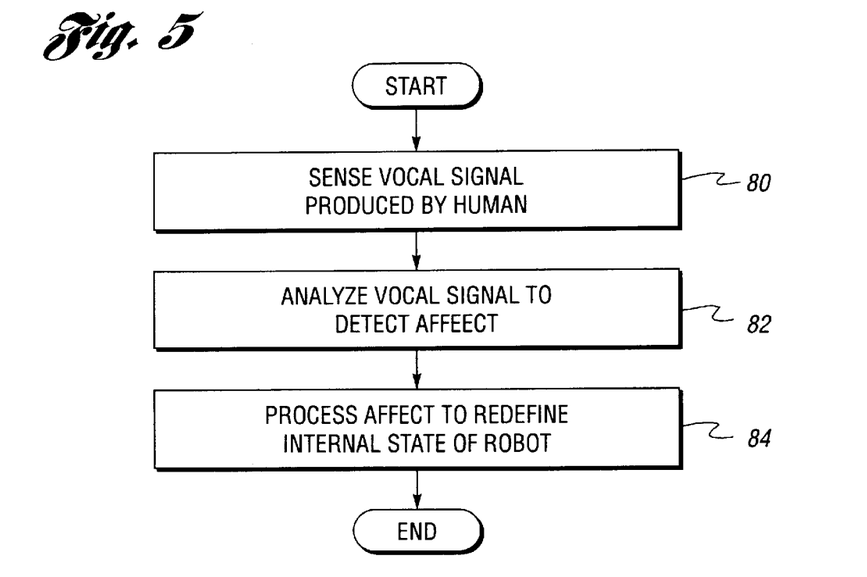
FIG. 5 is a flow chart of a method of sensing the affect of a human for use in controlling the operation of the robot.

Turning now to FIG. 5, there is shown a flow chart of a method of sensing the affect of a human for use in controlling the operation of the robot. As indicated by block 80, a step of sensing a vocal signal produced by a human is performed. The vocal signal is sensed by the auditory input sensor 40, and provided to the voice analyzer 42.

As indicated by block 82, a step of analyzing the vocal signal to detect an affect of the human is performed. The step of analyzing the vocal signal is performed by the voice analyzer 42 within the robot.

A step of processing the affect detected by the voice analyzer 42 is performed, as indicated by block 84. More particularly, the affect is processed to redefine the internal state of the robot. As a result, the internal state of the robot can be modified based upon the vocal expression of emotion by humans.

Figure 6:
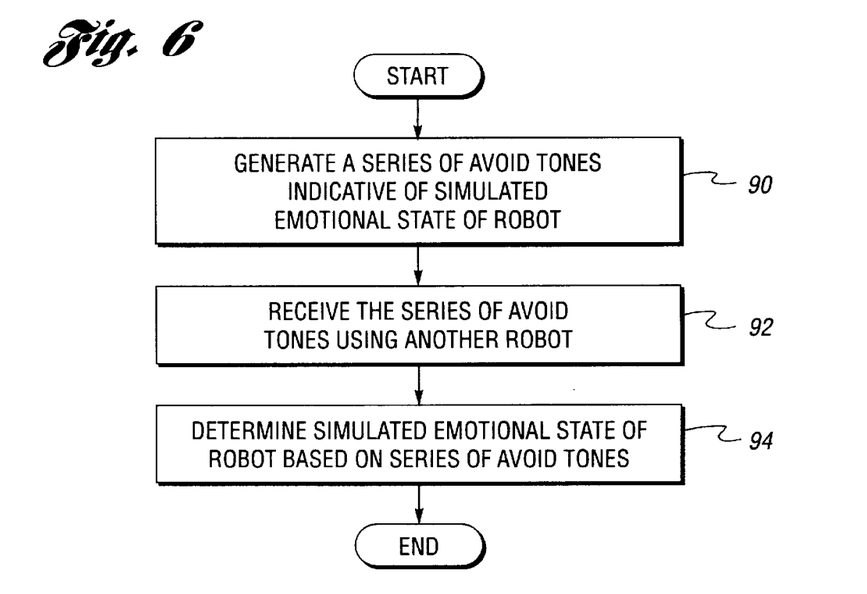
FIG. 6 is a flow chart of a method of communicating an internal state of a first robot to a second robot using a series of audio tones.

Turning now to FIG. 6, there is shown a method of communicating an internal state of a first robot to a second robot using a series of audio tones As indicated by block 90, a step of generating a series of audio tones indicative of a simulated emotional state of a robot is performed. The series of audio tones are generated using the audio output device 44 on the first robot.

As indicated by block 92, the second robot performs a step of receiving the series of audio tones. The series of audio tones are received on the second robot using its audio input device 46. The second robot next performs a step of determining the simulated emotional state of the first robot based upon the series of audio tones, as indicated by block 94.

Figure 7:
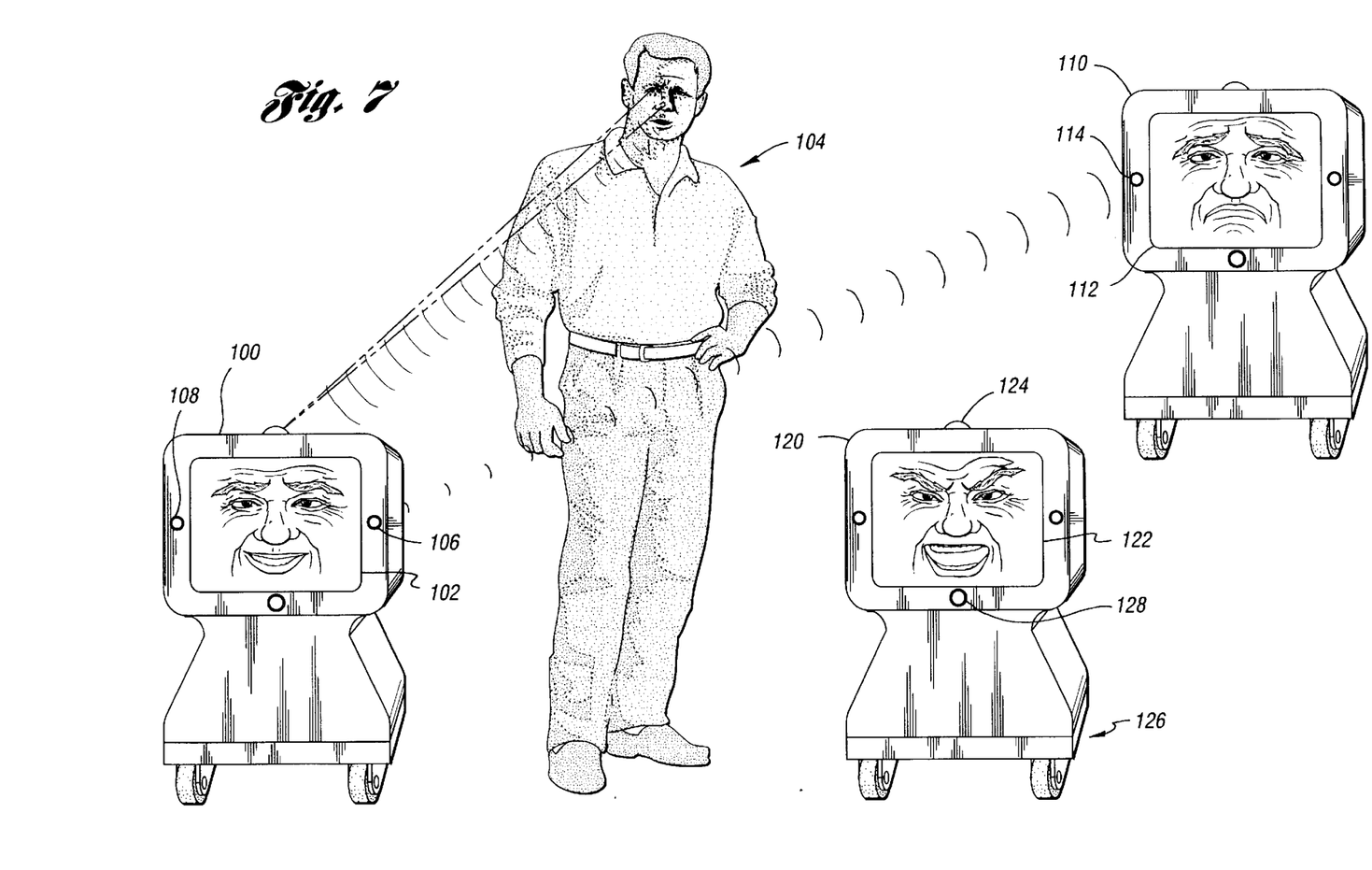
FIG. 7 is an environmental view of three robots in accordance with the present invention.

FIG. 7 is an environmental view of three robots constructed in accordance with the present invention. A first robot 100 has a simulated emotional state of happiness as indicated by a happiness facial expression displayed on a display device 102. The happiness facial expression on the display device 102 is discerned by a human observer 104. The first robot 100 also generates a series of audio tones indicative of its simulated happiness state using its audio output device 106. A vocal signal produced by the human observer 104 is sensed by an audio input device 108. The vocal signal is analyzed to detect its affect, and the affect is processed to redefine the simulated emotional state of the first robot 100.

A second robot 110 is displaying a sadness facial expression on a display device 112, which is indicative of a simulated emotional state of sadness. An audio input device 114 receives the series of audio tones produced by the robot 100. The second robot 110 determines the simulated emotional state of happiness of the first robot 100 based upon the series of audio tones. This simulated emotional state of the first robot 100 is processed by the second robot 110 to redefine its own simulated emotional state.

A third robot 120 has a simulated emotional state of anger as indicated by an angry facial expression displayed on a display device 122. An object sensor 124 detects the position of the second robot 110 within its environment. A control signal is generated for application to a transport mechanism 126. The transport mechanism 126 positions the third robot 120 to facilitate communication with the second robot 110.

Figure 8:
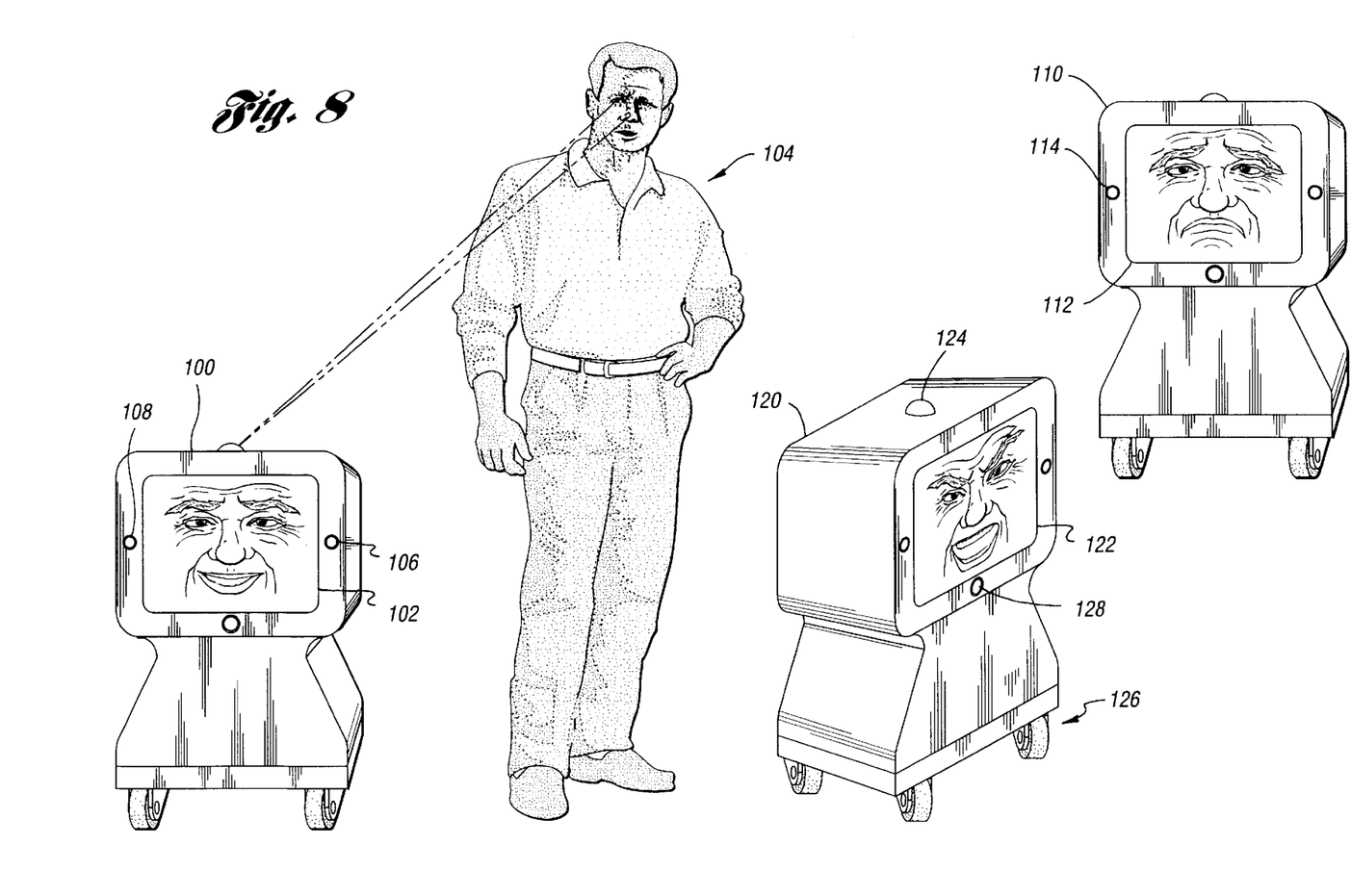
FIG. 8 is a second environmental view of the three robots.

FIG. 8 is a second environmental view of the three robots subsequent to the view in FIG. 7. As a result of the affect of the vocal signal produced by the human observer 104, the first robot 100 redefined its simulated emotional state to one of sadness. This is indicated by the sadness facial expression on the display device 102. The second robot 110 redefined its simulated emotional state to one of happiness based upon the series of audio tones received from the first robot 100. This is indicated by the happiness visual facial expression displayed on the display device 112.

The third robot 120 is repositioned by the transport mechanism 126 to facilitate communication with the second robot 110. A camera 128 on the third robot 120 views the sadness facial expression displayed on the display device 112. The third robot 120 determines that the second robot 110 has a simulated emotional state of sadness based upon the facial expression. This emotional state is processed by the third robot 120 in order to redefine its own simulated emotional state.

The above-described robots in accordance with the present invention are advantageous in communicating affect, i.e. feeling or emotion, with other robots and people in manners within the realm of human senses. As a result, a form of non-semantic communication between robots results which is also parsable by humans.

Further, the robots define a new paradigm which is a systematic inversion of the structural elements of the workstation. Each of the robots moves about, has a developmental history, is social with other robots, and is social with people. In comparison to workstations utilized at fixed points, the robots of the present invention operate in packs and flocks about humans to form a quantized field. Hence, the new paradigm which results is people-centric and body-centric, rather than desk-top centric.

The physical robots and the software running in the robots provide different levels of cybernetic organization. The software utilizes the robots as an environment for reproduction based upon a genetic algorithm. Tables controlling behaviors or emotions are modified using the genetic algorithm. A descent-with-modification evolution results from this reproduction. Such an architecture provides a decentralized and highly adaptive arena for both competition and cooperation.

A plurality of robots in accordance with the present invention can be built with the intention of creating these flocks. Additional social behaviors such as predator/prey and dominance hierarchy can be included in the robots. These additional social behaviors can be static as opposed to the adaptive behaviors described herein.

Embodiments of the present invention are advantageously interesting and engaging to both children and adults. As a result, the robots can take the form of toys used for entertainment purposes. Ultimately, every person can have several personal robots. Further, a number of public robots for use by a populace is envisioned.

It is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A robot comprising:
   a processor which executes a sequence of program steps to define a first internal state of the robot;
   a display device in communication with the processor, the display device displaying a first visual facial expression indicative of the first internal state of the robot, the first visual facial expression selected from a plurality of visual facial expressions; and
   a camera in communication with the processor to view a second visual facial expression from a like robot, wherein the processor determines a second internal state of the like robot from the second visual facial expression.

2. The robot of claim 1 wherein the first internal state is a simulated emotional state of the robot, and wherein the second internal state is a simulated emotional state of the like robot.

3. The robot of claim 1 wherein the plurality of visual facial expressions includes an anger expression, a sadness expression, and a happiness expression.

4. The robot of claim 1 wherein the first visual facial expression and the second visual facial expression are discernable by a human observer.

5. The robot of claim 1 further comprising a transport mechanism for positioning the robot within an environment based upon a control signal, wherein the processor generates the control signal for controlling the transport mechanism.

6. The robot of claim 5 further comprising at least one sensor in communication with the processor to detect a position of an object within the environment of the robot, wherein the processor generates the control signal to position the robot based upon the position of the object.

7. The robot of claim 6 wherein the object is a human.

8. The robot of claim 7 wherein the transport mechanism positions the robot to facilitate communication with the human.

9. The robot of claim 7 wherein the transport mechanism moves the robot in synchrony with movements of the human.

10. The robot of claim 6 wherein the object is the like robot.

11. The robot of claim 10 wherein the transport mechanism positions the robot to facilitate communication of the first visual facial expression and the second visual facial expression between the robot and the like robot.

12. The robot of claim 10 wherein the transport mechanism moves the robot in synchrony with movements of the like robot.

13. The robot of claim 1 wherein the processor processes the second internal state to redefine the first internal state.

14. The robot of claim 13 wherein the processor processes the second internal state using a genetic algorithm to redefine the first internal state.

15. The robot of claim 1 further comprising:
   an auditory input sensor to sense a vocal signal produced by a human; and
   a voice analyzer which analyzes the vocal signal to detect an affect of the human;
   wherein the processor processes the affect detected by the voice analyzer to redefine the first internal state.

16. The robot of claim 15 wherein the processor processes the affect using a genetic algorithm to redefine the first internal state.

17. A robot comprising:
   an object sensor to detect a position of a second robot within an environment of the first robot;
   a transport mechanism for positioning the robot within the environment based upon a control signal;
   a processor which executes a sequence of program steps to define a first simulated emotional state of the first robot, and to generate a control signal to control the transport mechanism based upon the position of the second robot sensed by the object sensor, wherein the transport mechanism positions the first robot to facilitate communication with the second robot;

a display device in communication with the processor to display a first visual facial expression indicative of the first simulated emotional state, wherein the first visual facial expression is discernable by a human observer;

a camera in communication with the processor to view a second visual facial expression from the second robot, the second visual facial expression indicative of a second simulated emotional state of the second robot discernable by the human observer;

an audio input device in communication with the processor to receive a series of audio tones from a third robot, the series of audio tones indicative of a third simulated emotional state of the third robot, the audio input device further sensing a vocal signal produced by the human observer; and a voice analyzer in communication with the processor to analyze the vocal signal to detect an affect of the human observer;

wherein the processor determines the second simulated emotional state of the second robot from the second visual facial expression and the third simulated emotional state of the third robot, and processes the second simulated emotional state, the third simulated emotional state, and the affect of the vocal signal to redefine the first simulated emotional state.

18. A method of operating a robot having a processor, a display device, and a camera, the method comprising the steps of:

executing a sequence of program steps using the processor to define a first internal state of the robot;

displaying a first visual facial expression on the display device, the first visual facial expression indicative of the first internal state of the robot, the first visual facial expression selected from a plurality of visual facial expressions;

viewing a second visual facial expression from a like robot using the camera; and determining a second internal state of the like robot from the second visual facial expression.

19. The method of claim 18 wherein the first internal state is a simulated emotional state of the robot, and wherein the second internal state is a simulated emotional state of the like robot.

20. The method of claim 18 wherein the plurality of visual facial expressions includes an anger expression, a sadness expression, and a happiness expression.

21. The method of claim 18 wherein the first visual facial expression and the second visual facial expression are discernable by a human observer.

22. The method of claim 18 wherein the robot further includes a transport mechanism for positioning the robot within an environment, the method further comprising the steps of:

generating a control signal for controlling the transport mechanism; and positioning the robot within the environment based upon the control signal.

23. The method of claim 22 further comprising the step of:

detecting a position of an object within the environment of the robot;

wherein the control signal is generated to position the robot based upon the position of the object.

24. The method of claim 23 wherein the object is a human.

25. The method of claim 24 wherein the transport mechanism positions the robot to facilitate communication with the human.

26. The method of claim 24 wherein the transport mechanism moves the robot in synchrony with movements of the human.

27. The method of claim 23 wherein the object is the like robot.

28. The method of claim 27 wherein the transport mechanism positions the robot to facilitate communication of the first visual facial expression and the second visual facial expression between the robot and the like robot.

29. The method of claim 27 wherein the transport mechanism moves the robot in synchrony with movements of the like robot.

30. The method of claim 18 further comprising the step of processing the second internal state to redefine the first internal state.

31. The method of claim 30 wherein the second internal state is processed using a genetic algorithm to redefine the first internal state.

32. The method of claim 18 further comprising the steps of:

sensing a vocal signal produced by a human;

analyzing the vocal signal to detect an affect of the human; and processing the affect detected by the voice analyzer to redefine the first internal state.

33. The method of claim 32 wherein the affect is processed using a genetic algorithm to redefine the first internal state.

34. A method of operating a first robot having a processor, a display device, a camera, and a transport mechanism, the method comprising the steps of:

detecting a position of a second robot within an environment of the first robot;

generating a control signal to control the transport mechanism based upon the position of the second robot, wherein the transport mechanism positions the first robot to facilitate communication with the second robot;

executing a sequence of program steps using the processor to define a first simulated emotional state of the first robot;

displaying a first visual facial expression on the display device, the first visual facial expression indicative of the first simulated emotional state of the first robot and discernable by a human observer;

viewing a second visual facial expression from the second robot using the camera, the second visual facial expression indicative of a second simulated emotional state of the second robot and discernable by the human observer;

determining the second simulated emotional state of the second robot from the second visual facial expression;

receiving a series of audio tones from a third robot, the series of audio tones indicative of a third simulated emotional state of the third robot;

sensing a vocal signal produced by the human observer;

analyzing the vocal signal to detect an affect of the human observer; and processing the second simulated emotional state, the third internal state, and the affect to redefine the first simulated emotional state.

35. A method of communicating an internal state of a first robot to a second robot, the method comprising the steps of:

displaying one of a plurality of visual facial expressions using a display device on the first robot, the one of the visual facial expressions being indicative of the internal state of the first robot;

viewing the one of the visual facial expressions using a camera on the second robot; and determining the internal state of the first robot based upon the one of the visual facial expressions viewed by the second robot.

36. The method of claim 35 wherein the internal state is a simulated emotional state of the first robot.

37. The method of claim 35 wherein the plurality of visual facial expressions includes an anger expression, a sadness expression, and a happiness expression.

38. The method of claim 35 wherein the visual facial expression is discernable by a human observer.

* * * * *